United States Patent Office 2,966,417
Patented Dec. 27, 1960

2,966,417

RED BALL POINT FOUNTAIN PEN INKS AND COLORANTS THEREFOR

Norman L. Anderson, Hamburg, N.Y., assignor to Allied Chemical Corporation, a corporation of New York No Drawing. Filed Jan. 3, 1958, Ser. No. 706,911

9 Claims. (Cl. 106—22)

This invention relates to red inks for ball point fountain pens which inks are characterized by high color strength and high color concentration in combination with excellent light-fastness and water-fastness, and to novel colorants having a rarely-found combination of properties which particularly suit them for use in such formulations.

The inks of the present invention contain high concentrations (preferably 40% to 50% by weight) of dissolved color. Their color strength exceeds that of conventional fountain pen inks by a factor of 20 fold or more. For example one cubic centimeter of an ink of the present invention will provide a written line of 10,000 to 15,000 feet or more equivalent to about 50,000 to 70,000 words, whereas an equal volume of conventional ink will provide a line of only 500 to 750 feet, equivalent to about 2500 to 4000 words. Ball point pens supplied with the inks of the present invention may be used, at average rates, for long periods before purchase of a refill cartridge containing a new ink supply is required. This advantage is important in enabling ball point fountain pens to compete successfully with conventional fountain pens.

Because of certain mechanical structural features of a ball point fountain pen inks therefor must meet many exacting specifications if satisfactory trouble-free service is to be obtained. The pen comprises a hollow tube open at the upper end and tapered at the lower end to a socket in which a hard (stainless steel, tungsten carbide, or sapphire) ball, having a diameter of about 1 millimeter, rotates. Clearance between the ball and socket varies from 1 to 5 microns depending on the style of pen and viscosity of ink used. The hollow tube serves as the ink reservoir which feeds the ink by gravity into the socket and against the upper surface of the ball. When the pen is used the ball rotates and transfers ink onto the receiving surface.

Although it is highly desirable that ball point fountain pen inks shall have a very high concentration of color value it is likewise important that the color should not crystallize out; this is particularly likely to happen if solvent evaporates from ink at the open tip of the ball point which results in a "freezing" of the ball to the socket. Accordingly the solvent used in the ink should have a low vapor pressure to avoid this evaporation. For water-fast colors the solvent should not be so hygroscopic that sufficient water will be absorbed from the atmosphere into ink exposed at the ball point to cause precipitation of color. For similar reasons the ink must be free of dust, grit, and insoluble matter and must be non-corrosive to the ball, socket or channel parts of the pen.

A ball point pen ink should be sufficiently viscous so that the ink will neither seep past the ball nor leak from the open upper end of the reservoir tube when the pen is inverted. Yet it must also be sufficiently fluid so that a film of ink is drawn between the ball and socket and onto the writing surface without producing an excessive drag on the ball as it rotates. Such drag causes the ink line to be thin with a resultant loss of color intensity, definition and legibility. The viscosity should also change very little within the range of temperatures at which use of the pen may be required.

Ball point pen inks must also have good light-fastness and water-fastness if adequate permanence of the written record is to be assured. For example, U.S. Government Federal Specifications No. TT-I-562 of June 12, 1950 require that ball point fountain pen inks meeting the specifications must provide samples of writing that remain legible after (1) 48 hours exposure to intense ultraviolet irradiation in the "Fade-O-Meter" instrument for measuring the light-fastness of colorants and (2) soaking in water at room temperature for a like period (the tests are made on separate samples). Under these test conditions, samples of writing made from the inks of the present inventiton (1) fade only slightly after 80 hours exposure in the "Fade-O-Meter" and (2) remain fast and do not run appreciably after soaking in water for 48 hours.

It has been known that diaryl guanidine salts of acid forms of sulfonic acid dyes are soluble in ethanol and the like and hence useful for dyeing pyroxylin lacquers, spirit varnishes and the like. However tests of hundreds of such colorants have shown that less than 0.5% of those tested had the color strength, light-fastness, water-fastness and especially the solubility in the ink solvents of the present invention required to make a ball point fountain pen ink of acceptable quality. No relationship is known which would enable one to predict whether or not a colorant is suitable for the ink formulations of the present invention upon the basis of the molecular structure of the colorant.

The only commercially available prior art inks providing writings which do not fade substantially completely after 8 to 20 hour "Fade-O-Meter" exposures and which remain legible after soaking in water for 48 hours or less have been certain blue inks based on light-fast and water-fast copper-phthalocyanine derivatives. Inks colored exclusively with such copper-phthalocyanine derivatives are somewhat weak in color strength and are of an unpopular greenish hue.

Heretofore ball point ink manufacturers have been unable to offer red inks having a quality comparable to that of blue inks based on copper-phthalocyanine derivatives because no colorants or combinations of colorants were known which possessed the requisite color, color strength, light-fastness, and water-fastness in combination with adequate solubility in solvents having the required combination of vapor pressure and flow properties. Since the inks of the present invention do have this combination of properties they satisfy a long felt need in the art. Red inks are desired for contrast entries in bookkeeping and for various specialty uses and are in considerable demand.

The novel colorants of the present invention have the following formula:

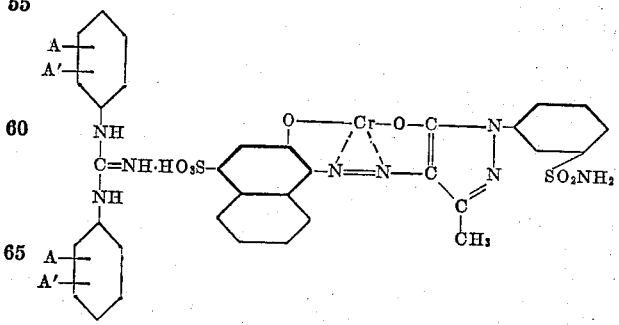

wherein the 6-membered rings are benzene rings, A and A' represent like or unlike members of the group consisting of H, $CH_3$, $C_2H_5$, $C_3H_7$ and i-$C_3H_7$ located in any of positions 2 to 6 in the rings. They may be considered as salts containing one mol of a basic component and one mol of an acidic component containing a sulfonic acid group. The basic component is a diphenyl guanidine of the structure

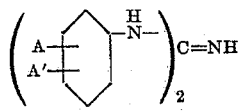

wherein A and A' are defined as above. The acid component is the acid form of New Colour Index Acid Red 191.

Preferred colorants are those wherein A and/or A' are $C_1$–$C_3$ alkyl groups. The colorant wherein both A and A' are hydrogen does not possess the extreme solubility of the preferred class of colorants but is less expensive and is useful for imparting light-fastness and water-fastness to ink formulations containing other colorants.

The colorants of the invention combine good color strength, good light-fastness and good water-fastness with good to extreme solubility in the solvent media, hereinafter defined, which characterize the inks of the present invention.

The colorants are ordinarily prepared by heating a mixture of an aqueous solution of the di-aryl guanidine component and an aqueous solution of the dye component. The resulting di-aryl guanidine salt of the acid form of the dye (which salt must be insoluble in water if the color is to be water-fast) precipitates out and is then isolated, dried, and ground.

The solvent characterizing the inks of the present invention consists—to the extent of at least 90% by weight—of a compound or a mixture of such compounds having the general formula:

$$R^1O(RO)_nH$$

wherein $R^1$ represents a member of the group consisting of H and $C_1$–$C_8$ alkyl groups, R is an alkylene group containing from 2 to 10 carbon atoms, inclusive, $n$ is an integer from 1 to 5, inclusive, and the total number of carbon atoms is from 2 to 10, inclusive.

Preferred solvents of this class are diols, i.e. compounds of the above general formula wherein $R^1$ is hydrogen.

Representative solvents of this class include ethylene glycol, propylene glycol, 1,3-butanediol, hexylene glycol, octylene glycol, monomethylether of ethylene glycol ("Methyl Cellosolve"), diethylene glycol, triethylene glycol, dipropylene glycol, and monoethyl ether of diethylene glycol ("Carbitol").

Despite the fact that these solvent media have low vapor pressures, the "drying" time of the inks is satisfactory because the solvent is usually absorbed by the paper and because the ink film laid down by the pen is very thin and contains a relatively low solvent/color ratio when compared to other inks.

The inks of this invention should contain at least 25% of dissolved color to assure adequate color strength; (this dissolved color may include however, colorants other than those characterizing the present invention). Preferably the color concentration should be from 40% to 50%. Color concentrations as high as 55% to 60% are obtainable with some formulations. This is surprising because the solvents are relatively hydrophilic in character whereas the colors are very insoluble in water. The viscosity desired for the ink may vary according to the style of the pen, particularly with reference to the clearance between the ball and socket at the ball point. In general the desired viscosity will range between 8,000 and 15,000 cps. at 25° C. Usually the desired viscosity is obtained simply by adjusting the color content of the ink because, at the high color concentrations involved, small changes in color concentration produce relatively large changes in viscosity. Viscosity may also be adjusted by incorporating a suitable resin into the ink although usually this is neither necessary nor desirable.

The inks are made by dissolving the color in the solvent, suitably by use of a high speed agitator, and then centrifuging the resulting solution to remove the last traces of insoluble matter.

If it is desired to modify the color of the ink, a shading component may be included. The following colors (in proportions limited by their low solubilities) have been found to be suitable as shading components: Auramine O (New Colour Index Basic Yellow 2); Victoria Green WB (New Colour Index Basic Green 4); Eosine OJ (New Colour Index Acid Red 87); Ethyl Eosine (Old Colour Index 770); Iosol Red (New Colour Index Solvent Red 68). Other colorants may be present in larger proportions. For example, the blue copper-phthalocyanine derivatives or the blue to violet di-aryl guanidine salts of Wool Violet 4BN (New Colour Index Acid Violet 49) or Brilliant Blue FFR (New Colour Index Acid Blue 104) which are described in my copending application entitled "Blue Inks for Ball Point Fountain Pens and Novel Colorants Therefor"; or the black di-aryl guanidine salts of New Colour Index Acid Black 52 which are described in my copending application entitled "Black Inks for Ball Point Fountain Pens," S.N. 698,332 and 698,380 of Nov. 25, 1957.

Novel shading colors which are particularly useful and preferred for modifying the shades of the red inks of the present invention are members of the class of salts of diphenyl guanidine (and its $C_1$–$C_3$ alkyl derivatives) with the acid form of New Colour Index Acid Red 18 defined by the following structure:

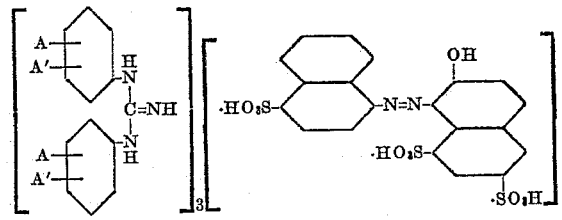

wherein the 6-membered rings are benzene rings, A and A' represent like or unlike members of the group consisting of hydrogen and $C_1$–$C_3$ alkyl radicals.

These shading components are of a scarlet color and possess excellent solubility in the solvents characterizing the inks of the present invention but do not have the light-fastness and water-fastness required to serve as the principal colorant in a permanent ink of good quality.

It is often desirable to incorporate about 1% to 5% by weight of oleic acid or the like into the ink to lubricate the ball and socket.

The following representative examples describe colorants and inks within the scope of the present invention.

*Example 1*

(A) *Preparation of colorant*

The colorant used in this example is a salt in which the basic component is a di(mixed xylyl) guanidine and the acid component is the acid form of the dyestuff known as New Colour Index Acid Red 191, which dyestuff is prepared in a manner well known in the prior art, by diazotizing 1-amino-2-hydroxynaphthalene-4-sulfonic acid, coupling the diazo compound into 1-(3'-sulfamylphenyl)-3-methyl-5-pyrazolone, and chroming the resulting monoazo compound. The di(mixed xylyl) guanidine was prepared by nitrating a commercial coal tar xylene containing about 62% m-xylene, 27% p-xylene, 18% o-xylene and 3% ethyl benzene, reducing the resulting mixture of nitroxylenes to obtain a mixture of xylidines, condensing this mixture with carbon disulfide, and treating the reaction product with ammonia and litharge.

523 parts (one mole equivalent) of said dyestuff (in the form of the sodium salt) were dissolved in 1200 parts of water at 85–90° C. The solution was charged with a solution of 267 parts (one mole equivalent) of di(mixed xylyl) guanidine in 3000 parts of water. 11.6 parts of 20°

Bé. aqueous hydrochloric acid were added in small increments during one hour. When addition of acid was complete the product precipitated out and was isolated by filtration. The filter cake was washed with 200 parts of cold water, dried at 70–80° C. and ground to a fine powder. A yield of 743 parts was obtained of Colorant A.

(B) *Solubility of colorant in solvents suitable for ink formulation*

Colorant A supra was found to be readily soluble at room temperature in the following solvents to give crystal-free solutions of the indicated concentrations.

| Solvent: | Parts colorant in 100 parts of solution |
|---|---|
| Diethylene glycol | 35 |
| Triethylene glycol | 35 |
| Propylene glycol | 35 |
| 1,3-butanediol | 35 |
| Hexylene glycol | 35 |
| Octylene glycol | 35 |
| Monoethyl ether of diethylene glycol ("Carbitol") | 35 |
| Mixture of 50% Butanediol and 50% octylene glycol | 40 |

(C) *Preparation of ink*

An ink was prepared by agitating the following mixture in a high speed agitator at 70°–80° C. until the colorant was substantially completely dissolved in the solvent.

| Component: | Parts by weight |
|---|---|
| 1,3-butanediol | 29 |
| Octylene glycol | 29 |
| Oleic acid | 2 |
| Colorant A | 40 |

The resulting solution was centrifuged to remove traces of insoluble matter.

The resulting ink, which had a viscosity of 11,000 cps. at 25° C., wrote freely and evenly in ball point fountain pens giving a well defined bluish red line of good color intensity which "dried" quickly and showed good resistance to smearing, feathering, offset and bleeding. It shows satisfactory writing characteristics over the temperature range 0°–100° F.

The color concentration of the ink was tested in a "mechanical scriber" which maintained a pen point and paper roll in relative motion so that a compressed zig-zag line was continuously formed on the paper. The color concentration was found to be equivalent to a line over 15,000 feet in length per cubic centimeter of ink consumed.

The light-fastness of a sample of writing made with the ink was tested by exposure to intense ultraviolet irradiation in the "Fade-O-Meter." Fading was only slight after 48 hours of exposure. The line remained well defined, adequately colored and easily legible after 100 hours of exposure.

The water-fastness of a sample of writing made with the ink was tested by soaking the sample in water at room temperature for 48 hours. A good visible line was retained and the color did not bleed appreciably.

Microscopic examination of the ink after storage for seven weeks showed that crystal formation was negligible.

EXAMPLE 2

This example describes an ink similar to that of Example 1 except that the shade is modified by a member of the preferred class of shading components previously defined.

(A) *Preparation of shading component*

The shading component used in this example is a salt in which the basic component is di(mixed xylyl) guanidine and the acid component is the acid form of the dyestuff New Colour Index Acid Red 18, which dyestuff is prepared, in a manner well known to the prior art, by diazotizing naphthionic acid and coupling the diazo compound into 2-hydroxynaphthalene-6,8-disulfonic acid. The resulting azo compound contains three free sulfonic acid groups and hence three mole equivalents of di(mixed xylyl) guanidine are needed to neutralize it.

One mole equivalent (604 parts) of said dyestuff (in the form of the trisodium salt) was dissolved in 600 parts of water at 60° C. The solution was charged with a solution of three mole equivalents (781 parts) of di(mixed xylyl)guanidine in 500 parts of water. 34.8 parts of 20° Bé. aqueous hydrochloric acid solution was added in small increments during one hour. When the addition of acid was complete the product precipitated out and was isolater by filtration. The filter cake was washed with 2000 parts of cold water, dried at 70–80° C., and ground to a fine powder. A yield of 880 parts was obtained.

(B) *Prepartion of ink*

An ink was made as described in Example 1 from the following formulation:

| Component: | Parts by weight |
|---|---|
| 1,3-butanediol | 29 |
| Octylene glycol | 29 |
| Oleic acid | 2 |
| Colorant A | 30 |
| Shading component | 10 |

The resulting ink is of a bright crimson shade and has a viscosity between 10,000 and 11,000 cps. at 25° C. Other properties of the ink are substantially the same as those given for the ink described in Example 1 except that it is somewhat less fast to light and water.

EXAMPLE 3

An ink was made as described in Example 1 from the following formulation:

| Component: | Parts by weight |
|---|---|
| Colorant A | 40 |
| Propylene glycol | 58.8 |
| Oleic acid | 1.2 |

The resulting ink has a viscosity of 9,800 cps. at 25° C. Other properties are similar to those described for the ink of Example 1.

I claim:

1. An ink suitable for ball point pens comprising essentially a solution of at least one compound of the formula

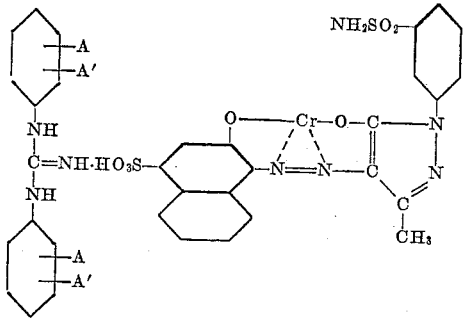

wherein A and A' each represents a member of the group consisting of H and $C_1$–$C_3$ alkyl, in a solvent comprising 90% of a $C_2$–$C_{10}$ diol of the formula

wherein R' represents a member of the group consisting of H and $C_1$–$C_8$ alkyl, R represents $C_2$–$C_{10}$ alkylene, and $n$ represents an integer from 1 to 5, inclusive.

2. An ink suitable for ball point pens comprising essentially a solution of at least one dixylyl guanidine salt of the acid form of Colour Index Acid Red 191 in a solvent comprising a $C_2$-$C_{10}$ compound of the formula $$R'O(RO)_nH$$

wherein R' represents a member of the group consisting of H and $C_1$-$C_8$ alkyl, R represents $C_2$-$C_{10}$ alkylene, and $n$ represents an integer from 1 to 5, inclusive.

3. An ink suitable for ball point pens consisting essentially of a solution of at least one compound of the formula set out in claim 1 in a solvent which is at least 90% of a $C_2$-$C_{10}$ diol of the formula $$HO(RO)_nH$$

wherein R represents $C_2$-$C_{10}$ alkylene, and $n$ equals 1 to 5, inclusive.

4. An ink suitable for ball point pens, consisting essentially of a solution of at least one dixylyl guanidine salt of the acid form of Colour Index Acid Red 191 in a solvent which is at least 90% $C_2$-$C_{10}$ diol of the formula $$HO(RO)_nH$$

wherein R represents $C_2$-$C_{10}$ alkylene, and $n$ equals 1 to 5, inclusive.

5. An ink as defined in claim 5 wherein at least one compound of the formula set out in claim 1 constitutes at least 25% of total colorant in the ink.

6. An ink as defined in claim 4, wherein said dixylyl guanidine salt of the acid form of Colour Index Acid Red 191 constitutes at least 25% of said ink.

7. An ink as defined in claim 5 including, as a shading component, a di-aryl guanidine salt of the acid form of Colour Index Acid Red 18.

8. An ink as defined in claim 6 including, as a shading component, a di-aryl guanidine salt of the acid form of Colour Index Acid Red 18, each aryl being a phenyl with no more than two $C_1$-$C_3$ alkyl substituents.

9. An ink as defined in claim 6 including, as a shading component, a dixylyl guanidine salt of the acid form of Colour Index Acid Red 18.

References Cited in the file of this patent

UNITED STATES PATENTS

| 1,674,128 | Rose | June 19, 1928 |
| 2,165,034 | Daudt et al. | July 4, 1939 |
| 2,623,827 | Moos | Dec. 30, 1952 |

OTHER REFERENCES

Lubs: "The Chemistry of Synthetic Dyes and Pigments," published 1955, Reinhold, N.Y.C. (pages 177–8).

Colour Index, 2d ed. (1956), vol. 2 (pp. 2840, 2853–4, 2882–3, 2896, 2904).

Gould et al.: "Inks for Ball Point Pens," American Ink Maker, July 1951, (pages 36–40 and 67).

UNITED STATES PATENT OFFICE
CERTIFICATION OF CORRECTION

Patent No. 2,966,417                  December 27, 1960

Norman L. Anderson

It is hereby certified that error appears in the above numbered patent requiring correction and that the said Letters Patent should read as corrected below.

Column 6, lines 66 and 67, for "compris- 90% of a $C_2$-$C_{10}$ diol" read -- comprising a $C_2$-$C_{10}$ compound --; column 7, line 23, for the claim reference numeral "5" read -- 3 --.

Signed and sealed this 4th day of July 1961.

(SEAL)
Attest:

ERNEST W. SWIDER                  DAVID L. LADD

Attesting Officer                  Commissioner of Patents